Patented July 6, 1948

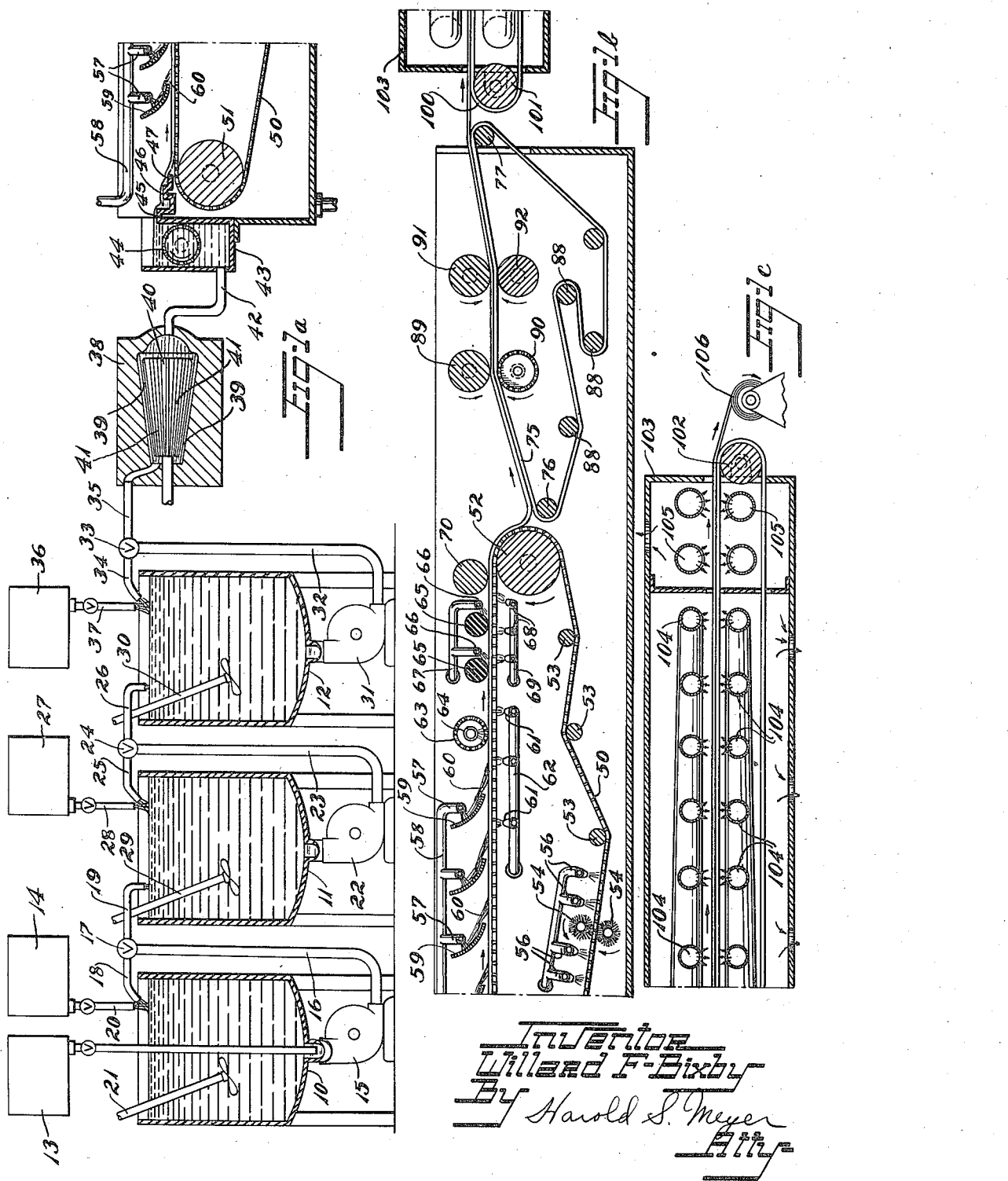

UNITED STATES PATENT OFFICE 2,444,626

METHOD AND APPARATUS FOR CONTINUOUSLY TRANSFORMING A DISPERSION OF A RUBBERY MATERIAL INTO A SHEET

Willard F. Bixby, Cleveland, Ohio, assignor to The B. F. Goodrich Company, New York, N. Y., a corporation of New York Original application May 9, 1942, Serial No. 442,350. Divided and this application October 1, 1945, Serial No. 619,581

13 Claims. (Cl. 18—15)

This invention relates to a method for continuously transforming a dispersion of a rubbery material into a sheet and to apparatus in which the method may be carried out.

The commercial methods of coagulating Hevea latex have been in general batch processes in which the rubber has been coagulated in shallow pans and then sheeted. Problems have arisen in connection with the coagulation and washing of synthetic rubber latices which are not encountered when Hevea latex is employed, largely due to the amount and kind of emulsifying agent present and to the fact that the particle size of synthetic rubber latex is ordinarily only from one-tenth to one-third as great as the particle size of Hevea latex.

It is an object of this invention to provide apparatus and a method for the continuous coagulation, washing, and drying of a dispersion of a rubbery material to form a uniform sheet. It is a further object to provide a method whereby a dispersion of a rubbery material can be coagulated to form a slurry containing small rubbery particles. It is a further object to provide a method for preventing the agglomeration of the small rubbery particles formed. It is a further object to provide a method for decreasing the size of large particles in a slurry of rubbery particles. It is a further object to provide a method of washing rubbery particles on a pervious carrier without disturbing their position. It is a further object to provide a method for pressing rubbery particles into a sheet upon a pervious carrier without causing the adhesion of the particles to the carrier. Further objects of the invention will be apparent from the following detailed description of the apparatus and a continuous method for transforming a specific synthetic rubber latex into a sheet.

Much of the difficulty which has heretofore attended attempts continuously to coagulate and sheet dispersions of rubbery materials has been experienced in attempts to wash the coagulum free from the emulsifying agent and other materials present during the polymerization which are not desired in the product. I have now discovered that the difficulties are largely avoided if a dispersion of a rubbery material is coagulated to form an aqueous slurry of uniform, small, rubbery crumbs, the slurry is deposited upon a pervious carrier to form a layer of crumbs, and the layer of crumbs is washed on the carrier without substantially disturbing the position of the crumbs before the layer is pressed into a sheet, dewatered, and dried.

The method of this invention may be applied to any dispersions of rubbery materials. Emulsion polymers of butadienes-1,3 such as butadiene-1,3, isoprene, piperylene, 2,3-dimethylbutadiene or 2-chlorobutadiene-1,3 or copolymers of butadiene-1,3 with monoethylenic monomers copolymerizable therewith in aqueous emulsion such as acrylonitrile, styrene, methyl methacrylate, or methyl isopropenyl ketone, prepared in alkaline emulsions with a soap such as sodium myristate, sodium palmitate, sodium oleate, or a mixture of soaps are preferred materials since they can be readily coagulated to form a slurry of uniform small crumbs less than 1 mm. in diameter by adding a salt to the latex and then lowering the pH to effect the coagulation. Butadiene-1,3 copolymers prepared in the presence of acid-stable emulsifying agents such as sodium lauryl sulfate may be coagulated in the form of uniform, small crumbs by merely adding a salt solution to the latex with stirring. Likewise, Hevea latex or artificial dispersions of natural or reclaimed rubber may be employed if they are compounded in such a manner that they can be coagulated to form a slurry of uniform, small crumbs.

The invention may be better understood from the accompanying drawing of which Figs. 1a, b and c illustrate apparatus suitable for coagulating, washing, sheeting and drying dispersions of rubbery materials.

Referring to the drawing, the formation of the slurry of small, rubbery crumbs is performed in tanks 10, 11 and 12. Two storage tanks 13 and 14 for brine and latex respectively lead into tank 10, the inlet from brine tank 13 extending through the tank and into the inlet of an open impeller centrifugal pump 15. Conduit 16 leads from the pump 15 to a cross valve 17 which distributes the contents of tank 10 between conduit 18 leading back into the tank 10 and conduit 19 leading into the coagulating tank 11. The treated latex flowing from the conduit 18 is intermingled with fresh latex flowing from storage tank 14 through conduit 20, and falls into tank 10 which is provided with a stirrer 21. Coagulating tank 11 also has an outlet leading into another open impeller centrifugal pump 22 from which a conduit 23 leads to cross valve 24 which divides the contents of the conduit between tanks 11 and 12 through conduits 25 and 26. The contents of conduit 25 are intermingled with coagulant solution flowing from supply tank 27 through conduit 28 and fall into tank 11 which is provided with a stirrer 29. Tank 12 is also provided with a stirrer 30, and has an outlet leading into another open impeller centrifugal pump 31 which discharges through conduit 32 into cross valve 33 dividing the contents between conduits 34 and 35. The contents of conduit 34 are intermingled with the pH-controlling material of supply tank 36, discharged through conduit 37, and returned to tank 12. Conduit 35 leads into a mechanical disintegrating device comprising a stator 38 provided with inwardly-extending knives 39 and a rotor 40 provided with outwardly-extending knives 41. The conduit 42 leads into the head-box 43 provided with a distributing roll 44 and the weirs 45, 46. An apron 47 extends from the head box to the sheet-forming portion of the apparatus.

The sheet-forming portion of the apparatus consists of an endless wire mesh screen 50 passing around driven rolls 51 and 52 and provided with tensioning rolls 53, 53 and cleaning rolls 54, 54 consisting of wire brushes. Spray pipes 56, 56 also assist in keeping the screen clean. Water for washing the material on the screen is sprayed from the nozzles 57, 57 in pipe 58 onto the spreader pans 59, 59, from whence it flows upon the material on the screen. The force of the spray is broken by the spreader pans 59, 59. Pieces of cloth 60 placed on the lower edges of the spreader pans, or screens (not shown) placed on the spreader pans at right angles to the direction of flow of the water may be employed to prevent channeling and assist in obtaining an even distribution of water. The washing means below the screen is located further along in the direction of motion of the screen than the washing means above the screen and consists of the nozzles 61, 61 in the pipe 62. The screen passes under a dandy roll 63 which is a hollow wire screen roll containing the spray 64, under the rubber press rolls 65, 65 after each of which is located washing means consisting of nozzles 66, 66 in a pipe 67 above the screen and nozzles 68, 68 in pipe 69 located under the screen. The screen then passes under the rubber couch roll 70 whose center of rotation is slightly nearer the head box than the center of rotation of the driving roll 52.

Further pressing of the material leaving the screen is achieved by passing the material on the felt 75 passing around the rolls 76 and 77 and the tensioning rolls 88, 88. The material on the felt is dewatered by passing between roll 89 and driven roll 90, roll 89 being a wooden roll and roll 90 being a suction roll, and by passing between the solid metal rolls 91 and 92.

The material passes from the felt 75 to the conveyor 100 driven by rolls 101 and 102 which passes through an oven 103 provided with hot air ducts 104, 104 above and below the conveyor. In a separate section of the oven, cold air ducts 105, 105 are placed above and below the conveyor. The cooled material finally passes from the conveyor to wind-up roll 106.

The operation of the apparatus will be explained by describing the continuous coagulation, washing, sheeting, dewatering, and drying of a synthetic rubber latex prepared by the emulsion copolymerization of 75 parts by weight of butadiene and 25 parts of styrene in the presence of 5 parts of soap (sodium oleate). The latex contained about 30% by weight of synthetic rubber. Such a latex is rather unstable and can be pumped only with difficulty. The first step in the operations is accordingly a stabilizing operation whereby the particle size of the synthetic rubber in the latex is increased while the particles still remain dispersed in the water. The stabilizing is conveniently accomplished by the addition to the latex of a water-soluble salt of a water-soluble acid, ordinarily sodium chloride or other salt which ionizes to yield monovalent cations, in an amount sufficient to increase the particle size of the latex but insufficient to cause irreversible coagulation as disclosed in the copending application of Edward A. Willson, Serial No. 442,368, now abandoned, filed May 9, 1942. The amount of salt employed will depend upon the concentration and nature of the latex, the concentration and nature of the emulsifying agent in the latex, the pH of the latex, and the particular salt added. For a synthetic rubber latex containing between 20 and 40% by weight of a copolymer of butadiene and styrene and from 3 to 8% based on the rubber of soap, from 10 to 50% by weight of sodium chloride based on the rubber are ordinarily required to achieve the desired increase in stability. Latices in which the soap is less soluble, as, for instance, those resulting from the emulsion copolymerization of butadiene and acrylonitrile, require smaller amounts of salt than latices such as those resulting from the copolymerization of butadiene and styrene in which the soap is quite soluble. The salt is added in the form of an aqueous solution, preferably containing from 5 to 15% of salt. Although more concentrated and even saturated salt solutions may be employed, it is more difficult to avoid the presence of high local concentrations of salt than when dilute solutions are used.

When the apparatus herein described is in operation, brine is contained in storage tank 13, latex is contained in storage tank 14, and tank 10 contains stabilized latex. Operations are ordinarily started by partially filling the tank 10 with water, then starting the flow of brine from tank 13. The pump is then started, and when the proper concentration of brine in tank 10 has been reached, the latex flow from tank 14 is started. After a time, the system comes to equilibrium. The addition of the salt increases the size and decreases the surface of the rubbery particles with the result that the stability of the latex is increased without any increase in the amount of emulsifying agent. The latex prior to the addition of the salt has an average particle size of only about 0.1 or 0.2 micron, but the stabilized latex has an average particle size of about 0.4 micron. The brine from tank 13 is preferably introduced into the stabilized latex at or near the entrance to the centrifugal pump 15, so that an intimate admixture will occur soon after addition of the brine and high local concentrations of salt will be prevented. The stabilized latex is then recycled through conduits 16 and 18 and led back into tank 10. Supply tank 14 is filled with latex which is added in sufficient volume to keep the supply of latex in tank 10 substantially constant. Impingement mixing is obtained by contacting the streams of untreated and turbulently-flowing salt-treated latex issuing from conduits 20 and 18 respectively, the velocity and amount of the salt-treated latex being considerably greater than the velocity and amount of the untreated latex. Other means of introducing a relatively small amount of untreated latex into the turbulently-flowing salt-treated latex may be employed. Thus conduit 20 may lead directly into conduit 18, and the treated latex flowing turbulently through the conduit may entrain the untreated latex and then pass into the tank 10. If desired, the pipes 20 and 18 can discharge beneath the surface of the liquid in tank 10, or can lead into a common pipe which discharges beneath the surface.

Although satisfactory results are obtained by adding a simple salt solution to stabilize the latex, additional advantages are obtained by including a buffer such as sodium bicarbonate, sodium acetate, sodium tetraborate or sodium acid phosphate in the brine solution in amounts considerably smaller than the salt. It is desirable in some cases at a later stage in the process to have present a protective agent the nature and function of which will be hereafter described. The protective agent is preferably added prior to the coagulation, although it may be added at a later stage in the process, and inclusion of the protective agent in the brine is a convenient method of addition.

For a latex of the composition herein described, the brine solution may contain 10% by weight of a salt such as sodium chloride, 1% of a buffer such as sodium bicarbonate, and 0.05 to 0.3% of a protective agent such as sulfonated rosin and/or sulfonated pine oil. The mixing may be efficiently performed by adding the brine and the latex at a rate of 2 gallons per minute through conduit ¼" in internal diameter, recirculating the latex through conduit 16 at a rate of 150 gallons per minute, diverting 4 gallons per minute through conduit 19, and recirculating 146 gallons per minute of stabilized latex through conduit 18 which may be about 2" in internal diameter.

The coagulation is effected in tank 11 which, at the start of the process is filled with coagulated latex slurry or water. The salt-treated latex entering the tank is mixed with the coagulated latex having a pH of about 8.5. The contents of the tank are pumped at the rate of 150 gallons per minute through conduit 23, with 5 gallons per minute being sent through conduit 26 and the remainder passing through conduit 25 and contacting the coagulant flowing from supply tank 27 through conduit 28 at a rate of 1 gallon per minute. Again, the high velocity and quantity of flow of the slurry issuing from pipe 25 as compared with the coagulant issuing from pipe 28 is important. The streams intermingle, and then fall into the coagulating tank 11. In this case the coagulant is 0.25% sulfuric acid, although acetic acid or other coagulants in suitable concentrations may also be employed. The same modifications in the mixing of the coagulant with a relatively large volume of turbulently-flowing slurry may be employed as in the mixing of the untreated latex with the salt-treated latex.

It is essential for the successful operation of the continuous process herein described that the synthetic rubber latex be coagulated in the form of uniform small particles, preferably under 1 mm. in diameter. In the particular method of coagulation herein described, a turbulently-flowing stream of a mixture of coagulated latex slurry and a small amount of uncoagulated salt-treated latex is mixed with a small stream of coagulant in such a manner that a high local concentration of either coagulant or uncoagulated latex is avoided. The particles thus formed range between 0.2 and 0.5 mm. in diameter. After the synthetic rubber has been coagulated in the form of uniform small particles, it is desirable to have present a protective agent to keep them from clumping together to form larger particles. If the subsequent treatment is such that the emulsifying agent is immobilized or destroyed, additional protective agent should be added. The protective agent may be any of the acid-stable wetting agents such as long chain alkyl sulfates including sodium lauryl sulfate, alkyl aryl sulfonates such as sodium isopropyl naphthalene sulfonate, aromatic or long-chain alkyl compounds containing a polyalkoxy chain terminating in a hydroxyl group, or sulfonated terpenes such as sulfonated rosin or pine oil, or protective colloids such as animal glue, gelatin, dextrin, starch, colloidal clay, etc. These protective agents are added to the latex before coagulation or to the slurry after coagulation in an amount sufficient to prevent the agglomeration of the rubbery crumbs.

The details of the next step in the process vary depending upon whether fatty acid is desired in the product or not. If it is desired to prepare synthetic rubber containing a substantial amount of fatty acid, the pH of the slurry of rubbery crumbs is reduced to about 4 to convert the soap into fatty acid. This may be done in tank 12, the slurry being recirculated at a rate of 150 gallons per minute, 5.6 gallons of slurry being diverted through pipe 35 and the remainder passing through pipe 34 and intermingling with dilute acid being fed from tank 36 through pipe 37 at a rate of 0.6 gallon per minute. A concentration of sulfuric acid of 1 or 2% is ordinarily sufficient to maintain the pH of the slurry at 4 or below. During this process, the rubbery crumbs grow to a size of from 0.5 to 0.8 mm.

If the presence of fatty acid is not desired in the final product, the aqueous slurry may be washed in tank 12 to extract as much of the soap as possible from the rubber particles. This washing operation is preferably performed at a pH of from 8 to 10. A solution of sodium hydroxide is added from tank 36 of a proper concentration to maintain the pH at the desired level. Additional tanks may be employed to wash the crumbs if desired.

If desired, the concentration of acid being fed from tank 27 can be high enough both to coagulate the latex and to convert the desired amount of soap into fatty acid. It has been found, however, that a somewhat more uniform slurry may be obtained by carrying on the coagulation and conversion of the soap as separate steps in the process.

The stabilization and coagulation of the dispersions of rubbery material in separate steps as shown above assists in the formation of a slurry of uniform, finely-divided rubbery crumbs, but it is not essential that these steps be carried on separately. Thus the synthetic rubber latex may be caused to entrain streams of salt solution and coagulant solution either successively or simultaneously while flowing turbulently through a conduit. Also, a turbulently-flowing slurry may be caused to entrain streams of uncoagulated latex and coagulant solution either successively or simultaneously. In another modification, a turbulently-flowing stream of synthetic rubber latex encounters jets of salt solution and coagulant solution as it is falling from a conduit into a container. Other means adapted to convert continuously a dispersion of a rubbery material into a slurry of small rubbery crumbs may also be employed.

If the coagulation of the latex has been carried on improperly and the size of the crumbs is not uniform or if there are agglomerates over 1 mm. in diameter in the slurry, it is desirable prior to the washing step to reduce mechanically the size of the crumbs without reforming an unfilterable dispersion. This may be done in any suitable mechanical disintegrator such as a paper beater, a Bauer mill, a Charlotte mill, or a Jordan engine.

A Jordan engine is shown in a simplified form in the drawing, but other mechanical disintegrators employing sets of knives or corrugated surfaces between which the crumbs are disintegrated may be employed. It is highly desirable that a protective agent be included in the slurry before it is fed through a mechanical disintegrator. If the coagulation has been effected in such a manner that the slurry consists of uniform particles not over about 1 mm. in diameter, however, there is no necessity for employing a mechanical disintegrator.

The slurry is next led into head box 43 provided with a distributing roll 44 which aids in maintaining an even distribution of the crumbs in the slurry and assists in preventing further increase in particle size. The distributing roll herein shown consists of a cylindrical sheet metal member containing 3/8" holes on 1/2" centers, although any other kind of perforated roll may be employed.

From the head box, the slurry passes over the weirs 45 and 46 and onto the screen 50. This screen may be made of any desired pervious material. A 70 mesh screen made of Duraloy wire (a nickel-copper alloy) has been found to be very satisfactory for the purpose since it is acid-resistant, and any synthetic rubber adhering to the screen can be burned therefrom taking proper precautions not to harm the wire. The crumbs form a porous layer upon the screen, and the washing process is then started. The impact of water being sprayed directly on the crumbs at this stage is apt to disturb the layer, so the water is preferably sprayed on a curved piece of metal 59 from which a stream of water flows upon the moving layer of crumbs while progressing at about the same velocity and in approximately the same direction. The force of the flow may be further broken by attaching a piece of woven or felted fibrous material 60 to the lower end of the trough 59. At this stage of the process, it is advantageous to employ hot wash water. The water may be at any desired temperature as from 120-200° F. In the particular operation herein described the wash water was heated to about 140° F.

After several washes from the top of the screen, the synthetic rubber particles have cohered to such an extent that they can be washed from beneath the screen without disturbing their position. This is effected by the sprays of hot water from the nozzles 61, 61 shown in the drawing. The sheet then passes under the dandy roll 63, which is a hollow metal roll having a perforated face allowing the free passage of water into the interior of the roll and preventing the formation of a bank of water in the bite of the roll which might break the sheet. The sheet then passes under the rubber press roll 65, and is then washed by a jet of cold water from nozzle 66 directed onto the sheet at the point where the pressure of the roll is removed. The sheet is in a distorted condition at this point, and absorbs water more readily than when the strains imparted to it by the roll have disappeared. The use of cold water at this point is a very important factor in the formation of a sheet of sufficient strength to permit the removal of the sheet from the screen. Although reduction of the temperature to 32° F. is not necessary, the water should be as cold as economically feasible, and it is very desirable that the temperature be below at least 100° F. Water of a temperature of about 60° F. was employed in the operations herein described. After passing under the roll 65, a jet of cold water, air, or other fluid from nozzle 68 underneath the screen lifts the sheet momentarily from the screen to prevent the sheet from permanently sticking thereto. The sheet is then passed under another rubber press roll 65, is washed with cold water from nozzle 66 directed at the bite of the roll, and is again lifted from the roll by another spray of cold water, air, or other fluid before passing under the next roll. These pressing, washing, and lifting operations may be repeated any desired number of times. The sheet then passes under a top couch roll 70 centered slightly ahead of the driving roll 52.

The continuous sheet now contains about 120% of water on a dry rubber basis, and is removed from the screen and to a carrier 75 which is preferably constructed of pervious, napless fibrous material such as a napless open-woven wool fabric. The sheet passes between press roll 89 and suction roll 90 where 50% of the water is removed, and then through press rolls 91 and 92 where 25% more of the original water is removed. These values apply to the specific synthetic rubber employed in this experiment, but they may vary widely with the type of synthetic rubber and the amount of fatty acid left in the synthetic rubber. The sheet then is transferred onto another conveyor 100, which should support and carry the sheet without contacting it over any greater area than necessary, and is carried through a hot air drying oven 103. The hot air blows upon the top and bottom of the sheet through ducts 104, 104, and may be of any suitable temperature from 140° to 320° F. or higher, for instance, depending upon the particular synthetic rubber being dried. The sheet then passes into another chamber where cold air is blown upon the sheet through ducts 105, 105, passes out of the oven, and onto a wind-up roll. Alternately, the sheet may be festooned and pressed into bales. The product is in the form of a uniform, coherent sheet having a pleasing appearance and is very easily broken down upon a roll mill.

This application is a division of my application Serial No. 442,350, now Patent No. 2,424,648, filed May 9, 1942.

I claim:

1. The method of continuously transforming an aqueous dispersion of a synthetic rubber comprising a polymer of a butadiene-1,3 into a synthetic rubber sheet which comprises producing from said dispersion an aqueous slurry of discrete synthetic rubber crumbs of a substantially uniform diameter between about 0.2 mm. and about 1 mm., depositing a uniform layer of the crumbs upon a pervious moving surface, directing upon the moving layer of crumbs a stream of water flowing in substantially the same direction as the movement of the layer of crumbs upon the surface so as to wash the individual crumbs without substantially disturbing their relative positions in the moving layer, and to permit the individual crumbs in the layer to cohere to form a porous sheet, applying pressure to the porous sheet on the moving surface sufficient to close the pores and form a continuous sheet and then removing the sheet from the moving surface.

2. The method of continuously transforming an aqueous dispersion of a synthetic rubber comprising a polymer of a butadiene-1,3 into a continuous synthetic rubber sheet which comprises producing from said dispersion an aqueous slurry of discrete synthetic rubber crumbs of a substantially uniform diameter between about 0.2 mm. and about 1 mm., depositing a uniform layer of the crumbs on a pervious moving surface, directing upon the moving layer of crumbs a stream of hot water flowing with substantially the same velocity and in substantially the same direction as the movement of the layer of the crumbs upon the surface so as to wash the individual crumbs without substantially disturbing their relative positions in the moving layer and to permit the individual crumbs in the layer to cohere to form a porous sheet, applying pressure to the porous sheet on the moving surface sufficient to close the pores and form a continuous sheet, immediately directing a jet of cold water onto the newly formed sheet to produce a water-containing self-sustaining sheet of substantial strength, removing the sheet from the moving surface and dewatering the sheet.

3. The method of continuously transforming an aqueous dispersion of a synthetic rubber comprising a polymer of a butadiene-1,3 into a continuous synthetic rubber sheet which comprises producing from said dispersion an aqueous slurry of discrete synthetic rubber crumbs of a substantially uniform diameter between about 0.2 mm. and about 1 mm., depositing a uniform layer of the crumbs upon a pervious moving surface, directing upon the moving layer of crumbs a stream of water flowing with substantially the same velocity and in substantially the same direction as the movement of the layer of crumbs upon the surface so as to wash the individual crumbs without substantially disturbing their relative positions in the moving layer and to permit the individual crumbs in the layer to cohere to form a porous sheet, applying pressure to the porous sheet on the moving surface sufficient to close the pores and form a continuous sheet, directing a jet of fluid upon the underside of the sheet through the pervious surface momentarily to raise the sheet from the surface and thereby prevent permanent adherence thereto and then removing the sheet from the moving surface.

4. The method of continuously transforming an aqueous dispersion of a synthetic rubber comprising a polymer of a butadiene-1,3 into a synthetic rubber sheet which comprises producing from said dispersion an aqueous slurry of discrete synthetic rubber crumbs of a substantially uniform diameter between about 0.2 mm. and about 1 mm., depositing a uniform layer of the crumbs upon a pervious moving surface, directing upon the moving layer of crumbs a stream of water flowing in substantially the same direction as the movement of the layer of crumbs upon the surface so as to wash the individual crumbs without substantially disturbing their relative positions in the moving layer and to permit the individual crumbs in the layer to cohere to form a porous sheet, applying pressure to the porous sheet on the moving surface sufficient to close the pores and form a continuous sheet, immediately directing a jet of water onto the newly formed sheet to produce a water-containing self-sustaining sheet of substantial strength, removing the sheet to another less pervious moving surface and applying pressure to one side of the sheet and suction to the other side of the sheet to dewater the sheet upon the less pervious moving surface.

5. The method of continuously transforming an aqueous dispersion of a synthetic rubber comprising a polymer of a butadiene-1,3 into a synthetic rubber sheet which comprises producing from said dispersion an aqueous slurry of discrete synthetic rubber crumbs of a substantially uniform diameter between about 0.2 mm. and about 1 mm., depositing a uniform layer of the crumbs upon a pervious moving surface, directing upon the moving layer of crumbs a stream of water flowing with substantially the same velocity and in substantially the same direction as the movement of the layer of crumbs upon the surface so as to wash the individual crumbs without substantially disturbing their relative positions in the moving layer and to permit the individual crumbs in the layer to cohere to form a porous sheet, applying pressure to the porous sheet on the moving surface sufficient to close the pores and form a continuous sheet, removing the sheet from the moving surface, passing the sheet through a blast of hot air to dry the sheet and then passing the sheet through a blast of unheated air to cool the sheet.

6. The method of continuously transforming an aqueous dispersion of a synthetic rubber comprising a polymer of a butadiene-1,3 into a synthetic rubber sheet which comprises producing from said dispersion an aqueous slurry of discrete synthetic rubber crumbs of a substantially uniform diameter between about 0.2 mm. and about 1 mm., depositing a uniform layer of the crumbs upon a pervious moving surface, directing upon the moving layer of crumbs a stream of water flowing with substantially the same velocity and in substantially the same direction as the movement of the layer of crumbs upon the surface so as to wash the individual crumbs without substantially disturbing their relative positions in the moving layer and to permit the individual crumbs in the layer to cohere to form a porous sheet, applying pressure to the porous sheet on the moving surface sufficient to close the pores and form a continuous sheet, immediately directing a jet of water onto the newly formed sheet to produce a water-containing self-sustaining sheet of substantial strength, directing a jet of fluid upon the underside of the sheet through the pervious moving surface momentarily to raise the sheet from the surface and thereby prevent permanent adherence thereto, removing the water-containing sheet from the moving surface to another less pervious moving surface, applying pressure to one side of the sheet and suction to the other side of the sheet, while upon the less pervious moving surface, to dewater the sheet and then drying the sheet.

7. In a method of continuously transforming an aqueous dispersion of a synthetic rubber comprising a polymer of a butadiene-1,3 into a sheet, which method involves first producing from said dispersion an aqueous slurry of discrete synthetic rubber crumbs and then forming the crumbs into a sheet, the steps which comprise depositing a uniform layer of the crumbs upon a pervious moving surface, directing upon the moving layer of crumbs a stream of water flowing in substantially the same direction as the movement of the layer of crumbs upon the surface so as to wash the individual crumbs without substantially disturbing their relative positions in the moving layer and then applying pressure to the crumbs on the moving surface to form a continuous synthetic rubber sheet.

8. Apparatus for the continuous transformation of an aqueous slurry of small discrete rubbery particles into a continuous sheet comprising a pervious movable conveyor, means for depositing a uniform layer of the discrete rubbery particles thereon, a liquid delivering element positioned above the conveyor and having a discharge portion disposed substantially tangentially to the conveyor in the direction of movement thereof for applying wash water to the individual particles without substantially disturbing their relative positions in the layer and a pressure-applying element disposed above the conveyor at a point in its direction of movement beyond that of the liquid delivering element for pressing the washed particles into a continuous sheet.

9. Apparatus for the continuous transformation of an aqueous slurry of small discrete rubbery particles into a continuous sheet comprising a travelling wire screen, means for depositing a uniform layer of the discrete rubbery particles thereon, a series of inclines each positioned above the screen and extending at its lower end in a direction substantially horizontal to the screen for applying wash water to the particles without substantially disturbing their relative positions on the screen, a series of pressure rolls each disposed above the screen at a point in its direction of movement beyond that of the said series of inclines for pressing the washed particles into a continuous sheet and a series of liquid delivering orifices each positioned above the screen at a point in its direction of movement just beyond that of one of the said pressure rolls for flowing a stream of water onto the sheet as it leaves the roll to increase the strength of the sheet.

10. Apparatus for the continuous transformation of an aqueous slurry of small discrete rubbery particles into a continuous sheet comprising a travelling wire screen, means for depositing a uniform layer of the discrete rubbery particles thereon, a liquid delivering element positioned above the conveyor and having a discharge portion disposed substantially tangentially to the conveyor in the direction of movement thereof for applying wash water to the individual particles, thereby washing the particles and permitting the particles to cohere into a porous sheet, an orifice positioned below the screen at a point in its direction of movement beyond the said liquid delivering element for applying additional wash water to the underside of the porous sheet, a pressure-applying element disposed above the conveyor at a point still further removed in its direction of movement for pressing the washed particles into a continuous sheet and another liquid delivering orifice positioned above the screen at a point in its direction of movement just beyond that of the said pressure-applying element for flowing a stream of water onto the sheet as it leaves the pressure-applying element so as to increase the strength of the sheet.

11. Apparatus for the continuous transformation of an aqueous slurry of small discrete rubbery particles into a continuous sheet comprising a travelling wire screen and a travelling napless fibrous carrier, means for depositing a layer of the discrete rubbery particles upon the travelling wire screen, a liquid delivering element positioned above the screen and having a discharge portion disposed substantially tangentially to the screen in the direction of movement thereof for applying wash water to the individual particles without substantially disturbing their relative positions in the layer, a pressure-applying element disposed above the conveyor at a point in its direction of movement beyond that of the liquid delivering element for pressing the washed particles into a continuous sheet, a liquid delivering orifice positioned above the screen at a point in its direction of movement just beyond that of the said pressure-applying element for flowing a stream of water onto the newly formed sheet to increase the strength of the sheet, means for removing the sheet from the travelling wire screen onto the travelling napless fibrous carrier, a pressure element positioned above the fibrous carrier and a suction element positioned below the fibrous carrier at a point beneath that of the said pressure element for dewatering the sheet upon the fibrous carrier.

12. Apparatus for the continuous transformation of an aqueous dispersion of a rubbery material into a sheet comprising a coagulating tank for coagulating the dispersion in a crumb-like form, a mechanical disintegrator for reducing the crumbs into a uniform small size, a pervious movable conveyor, means for depositing a uniform layer of the small rubbery crumbs thereon, a liquid delivering element positioned above the conveyor and having a discharge portion disposed tangentially to the conveyor in a direction of movement thereof for applying wash water to the individual particles without substantially disturbing their relative positions in the layer and a pressure-applying element disposed above the conveyor at a point in its direction of movement beyond that of the said liquid delivering element for pressing the washed particles into a continuous sheet.

13. In an apparatus for the continuous transformation of an aqueous dispersion of a rubbery material into a sheet, which apparatus includes means for producing from said dispersion a slurry of small rubbery crumbs and means for drying the rubbery sheet produced from the crumbs, a crumb-washing and sheet-forming unit including a pervious movable conveyor, means for applying a uniform layer of discrete rubbery crumbs thereon, a liquid delivering element positioned above the conveyor and having a discharge portion disposed substantially tangentially to the conveyor in the direction of movement thereof for applying wash water to the individual crumbs without substantially disturbing their relative positions in the layer and a pressure-applying element disposed above the conveyor at a point in its direction of movement beyond that of the liquid delivering element for pressing the washed crumbs into a continuous sheet.

WILLARD F. BIXBY.

REFERENCES CITED

The following references are of record in the file of this patent:

UNITED STATES PATENTS

| Number | Name | Date |
| --- | --- | --- |
| 2,032,941 | Linscott et al. | Mar. 3, 1936 |
| 2,182,274 | Baker | Dec. 5, 1939 |
| 2,340,243 | Beal | Jan. 25, 1944 |
| 2,366,460 | Semon | Jan. 2, 1945 |
| 2,371,722 | Wanderer | Mar. 20, 1945 |
| 2,384,277 | Calcott et al. | Sept. 14, 1945 |